United States Patent [19]

Herman et al.

[11] Patent Number: 5,777,266

[45] Date of Patent: Jul. 7, 1998

[54] MODULAR CABLE PROTECTION SYSTEM

[75] Inventors: Wallace U. Herman, Fairfield; David L. Lutz, North Branford, both of Conn.

[73] Assignee: Hubbell Incorporated, Orange, Conn.

[21] Appl. No.: 835,380

[22] Filed: Apr. 7, 1997

[51] Int. Cl.⁶ .................................................. H02G 9/04
[52] U.S. Cl. .................. 174/68.1; 403/364; 403/387; 174/97; 138/155
[58] Field of Search ........................... 174/68.1, 91, 95, 174/96, 97, 98, 136; 138/155, 157, 162, 166; 59/78.1; 403/364, 381, 387; 52/220.5, 590.1, 590.2; 104/275

[56] References Cited

U.S. PATENT DOCUMENTS

| | | | |
|---|---|---|---|
| 585,540 | 6/1897 | Spangler | 104/275 |
| 1,914,830 | 6/1933 | Kostohris | 104/275 |
| 2,079,274 | 5/1937 | Baker | 174/95 |
| 2,299,356 | 10/1942 | Strohm et al. | 104/275 |
| 3,118,017 | 1/1964 | Wimbish | 174/97 |
| 3,725,580 | 4/1973 | Thompson et al. | |
| 3,878,317 | 4/1975 | Plaskon | |
| 3,888,186 | 6/1975 | Jentzsch et al. | 104/275 |
| 4,192,062 | 3/1980 | Balde et al. | |
| 5,095,822 | 3/1992 | Martin | 104/275 |

Primary Examiner—Bot L. Ledynh
Assistant Examiner—Dhiru R. Patel
Attorney, Agent, or Firm—Jerry M. Presson; Leopold Presser

[57] ABSTRACT

A modular cable protection system which is intended to protect electrical cables, fluid hoses and data cables from externally caused physical or mechanical damage. The modular protective components may be detachably interlocked with other structural components so as to form a suitably sized cable protection system. The components may be constituted of molded plastic material of high rigidity and strength, and are adapted to be selectively joined to other components as required to provide the necessary protective array in a simply assembled and decorative manner which not only fulfills the desired protective tasks but which is also authentically pleasing in appearance. Further components, in the form of accessories, include spaced male and female interlockable connectors and are adapted to be latchingly connected to respective complementary female and male connectors as required, may be tapered or shaped so as to extend between a height coextensive with that of the cable protector at the juncture therewith, to a thinner edge at the opposite end so as to form a crossover ramp at least at one side and preferably both sides of the cable protector or protectors.

20 Claims, 5 Drawing Sheets

MODULAR CABLE PROTECTION SYSTEM

BACKGROUND OF THE INVENTION

1. Field of the Invention

The present invention relates to a modular cable protection system which is expandable in both crossover length and cable capacity and intended to protect electrical cables, fluid hoses and data cables from externally caused physical or mechanical damage.

In many instances, it becomes necessary to provide expandable protective arrangements for electrical cables, fluid hoses and data cables, among other similar equipment, when such equipment is positioned on the ground so as to temporarily extend across walkways, site roads which are traversed by pedestrians and possible some vehicular traffic. Thus, in order to not only protect such equipment from physical damage, consideration must be given to also shielding the public; in essence, the pedestrians or vehicular travelers, from any potential injuries caused; for example, by tripping over any exposed cables, hoses or similar equipment lying in or extending across the roadway or site road.

2. Discussion of the Prior Art

Although protective measures have been taken by industry, particularly the construction industry in protecting such equipment and shielding pedestrians or passersby from potential injury by covering the equipment, such as electrical cables, hoses and the like, which temporarily lies on the ground extending across walkways and site roads. Generally, such protective measures have been constituted of placing plywood or metal plates or gratings over the equipment, possibly raised up to some extent by being shimmed with blocks to form passageways therebeneath for the equipment which is to be protected.

SUMMARY OF THE INVENTION

In order to improve upon the current state-of-the-art in protecting equipment of the above-described types, the invention contemplates the provision of expandable modular protective components which may be detachably interlocked with other structural components so as to form a suitably sized, both in crossover length and cable capacity, cable protection system. The components may be constituted of molded plastic material of high rigidity and strength, and are adapted to be selectively joined to other components as required to provide the necessary protective array in a simply assembled and provide a visual caution with color and ANSI safety symbols molded in.

In particular, the modular cable protection system comprises at least one cable protector component constituted of a flat base and a superimposed flat defining a space therebetween, whereby cover is fastened to the base so as to be openable and closable relative thereto through the intermediary of a hinge connection. The base which is essentially of rectangular configuration, and is adapted to be placed on the ground or a flat surface such as a walkway or site road, along the perimeter thereof possesses male and female interlockable connector elements, and thereby enables the latched interconnection of a plurality of cable protectors at either the sides and/or end surfaces thereof so as to form a modular cable protection arrangement. The interior of the base may be equipped with suitable upstanding ribs extending in spaced relationship transversely of the base, which provide support for the cover in the closed condition of the latter, and which constitute barriers between cables laid in the passageways or spaces formed intermediate the ribs.

Further components, in the form of accessories, which are also constituted of rectangular configurations and include spaced male and female interlockable connectors and are adapted to be latchingly connected to respective complementary female and male connectors as required, may be tapered or sloped to conform with "Standards for Accessible Design" (28 C.F.R. Part 36) so as to extend between a height coextensive with that of the cable protector at the juncture therewith, to a thinner edge at the opposite end so as to form a crossover ramp at least at one side and preferably both sides of the cable protector or protectors.

Suitable curbs that conform with the guidelines of 28 C.F.R. Part 36 which are essentially raised elements may be attached by means of spaced male and female connectors to the complementary female and male connectors at end edges of, respectively, the cable protector or protectors and to the components constituting the tapered or sloped crossover components so as to form guide edges or curbs when the entire arrangement is installed by laying the cable protector base on the ground, and connecting the respective further protectors and ramp crossover accessories through the intermediary of the interengaged male and female connectors. The cover being opened on the cable protector or protectors and with the cables having been positioned in the base or bases intermediate the ribs so as to extend out from the ends below the curbs, the cover or covers is or are closed and, preferably locked in place with suitable fasteners.

The foregoing arrangement, which may be constituted with ANSI safety symbols in highly visible contrasting color of molded plastic components is intended to form a temporary crossover ramp and cable protector system whereby the various cables and/or fluid lines or hoses are protected from contact by pedestrians and/or any other traffic crossing over, thereby avoiding any tripping hazards, and protecting cables which are intended temporarily to run across site roads or walkways.

Accordingly, pursuant to the invention, there are provided one or more cable protectors, preferably constituted of a rigid molded plastic material, which protector is of essentially rectangular configuration, and has a hinged cover structure fastened to a base incorporating upstanding ribs which will form passageways therebetween for various electrical cables, fluid lines or data cables and the like, while the upstanding ribs, upon the cover being closed and fastened into the closed position, will form a support structure preventing the cover from being deflected downwardly responsive to the weight of anyone stepping thereon.

Furthermore, in order to provide structure which enables the crossing over by pedestrians or other traffic over site roads, walkways and the like, with the cables being protected while in the protector arrangement, suitable sloped, rectangular plate-like plastic elements, may also be attached to the respective sides of the cable protector in interlocking engagement therewith through the use of the male and female connectors, so as to form a complete crossover arrangement of any desired size as required by the particular intended applications. In order to ensure that the interconnected elements form the required temporary walkway, suitable bar-shaped curbs may be attached to respectively the cable protectors on opposite ends thereof, and similar but tapered curbs to the tapered or sloping crossover elements or ramps which are attached thereto, so as to form modular cable protection system compliant with 28 C.F.R. Part 36 and inhibiting any tripping of pedestrians or the contacting of electrical equipment by traffic or the like passing over the essentially temporarily installed modular cable protection arrangement.

Accordingly, it is an object of the present invention is to provide a modular cable protection system including a cable protector of essentially rectangular configuration having male and female connectors, and which is adapted to receive suitable electrical cables, fluid lines and the like which are to be protected, and wherein the cable protector is adapted to be attached in series and/or in parallel to further cable protectors as required to form a modular cable protection arrangement.

Another object of the present invention is to provide a cable protection system as described herein, including tapered or sloping ramps which are attachable through the intermediary of male and female connectors to respectively further cable protectors so as to form complete and more extensive cable protection systems including crossover ramps and curbs.

BRIEF DESCRIPTION OF THE DRAWINGS

Reference may now be had to the following detailed description of preferred embodiments of the invention, taken in conjunction with the accompanying drawings; in which.

DETAILED DESCRIPTION OF PREFERRED EMBODIMENT

Figure 1:
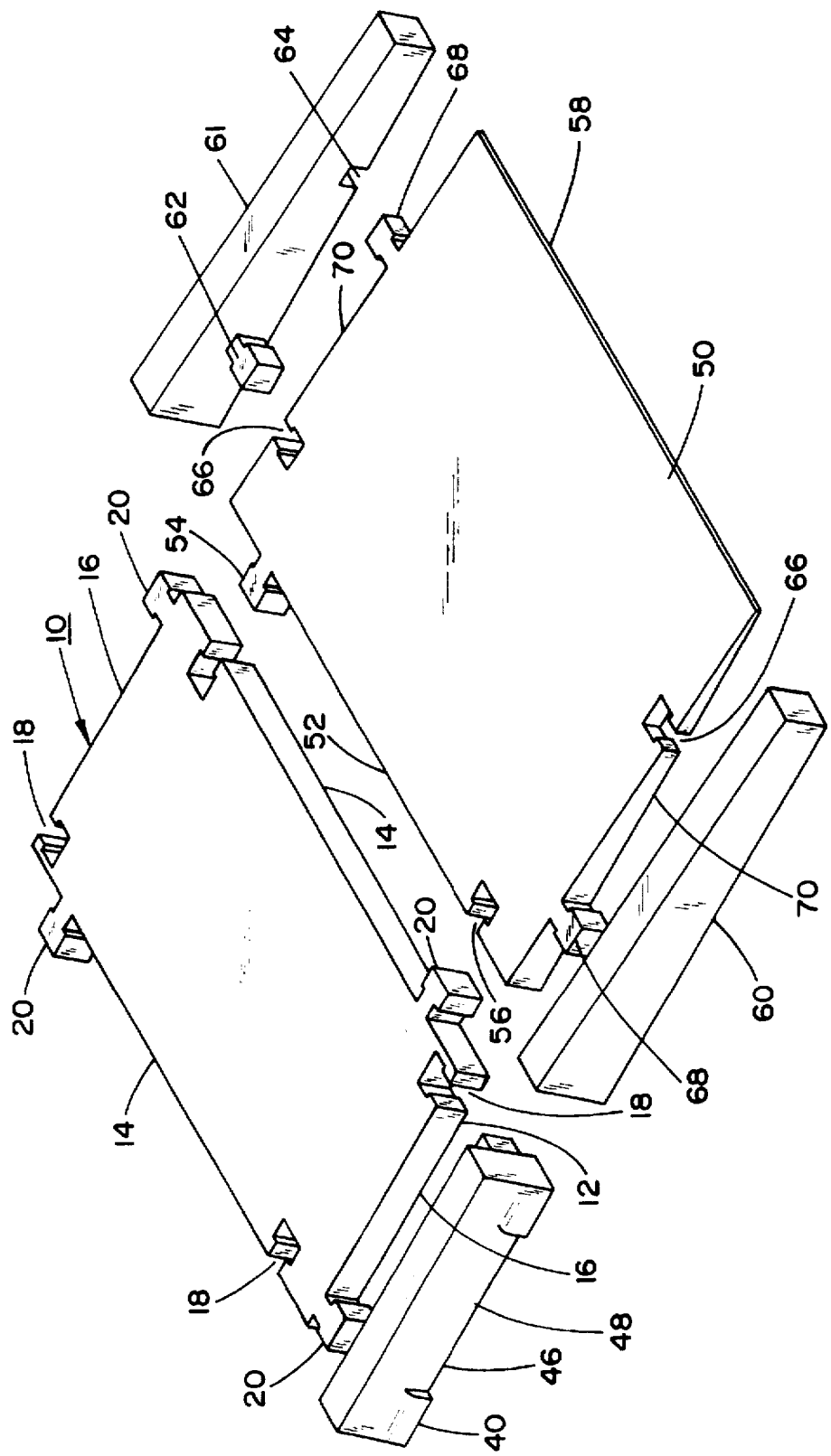
FIG. 1 illustrates an exploded perspective view of a cable protector and a single crossover ramp which is adapted to be attached thereto, including the curb elements for forming a complete cable protection arrangement.
Figure 2:
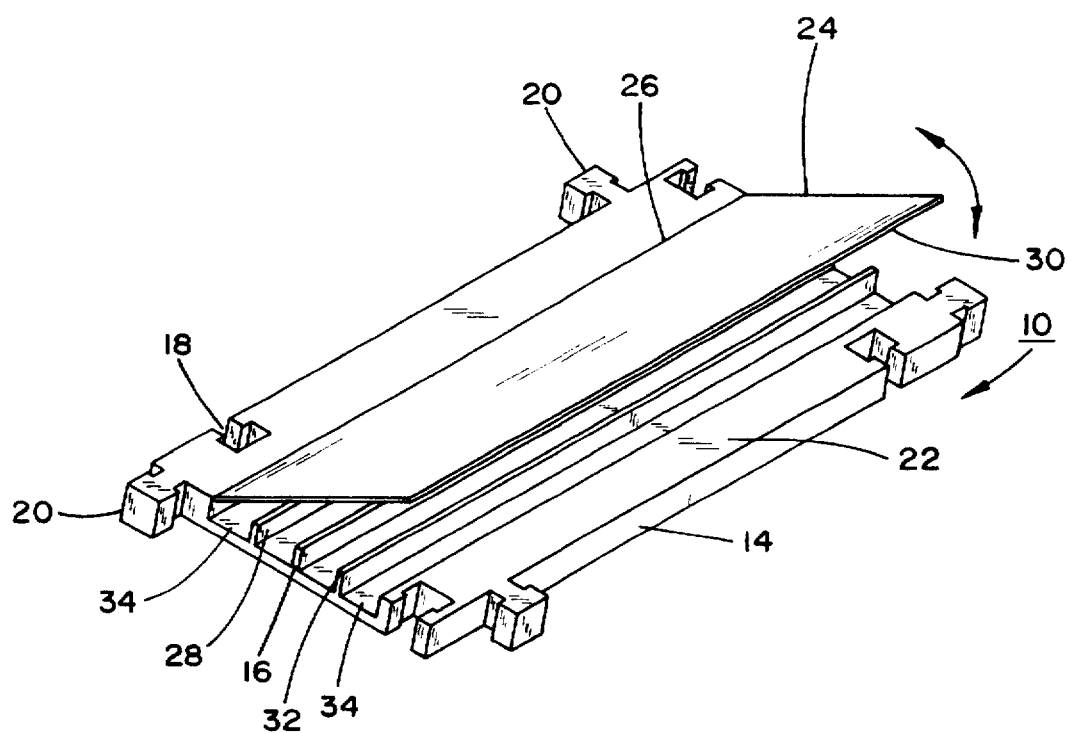
FIG. 2 illustrates a perspective view of the cable protector of FIG. 1 shown with the cover in the upwardly pivoted opened position.

Referring now in specific detail to the drawings, and particularly FIGS. 1 and 2, there is illustrated a cable protector 10 which, essentially, comprises a rectangular box-like element having a flat base 12, side walls 14 and the channels 16 which extend the length of the protector. Formed about the walls of the base are, respectively female and male connector elements 18, 20, in the shape of preferably so-called "tongue-and-groove" fasteners which are adapted to interengage in order to form a suitable latching arrangement.

Hingedly connected to an upper-edge area 22 of the rectangular base 12 is a plate-like cover element 24, so as to be pivotable about a hinge structure 26 extending between the respective ends of the base, as shown in FIG. 2. The base 12 which is essentially upwardly open may be equipped with a series of longitudinally extending spaced upstanding rib members 28 of a height coextensive with the height of the cable protector structure so that, upon the cover being closed, the bottom surface 30 thereof rests on the upper edges 32 of the rib members 28, the latter of which provide a supporting structure for the cover.

The end channels 16 of the cable protector base 12 include openings 34 to enable electrical cables or hoses to extend longitudinally within spaces present between the rib members 28, the latter of which form barriers between adjacent cables, and to extend outwardly of the end channels 16, as required.

Adjacent each of the end channels 16 of the cable protector 10, the latter of which are equipped with male and female connector elements 18, 20, is a bar-shaped rectangular member 40 which is higher in its construction than protector 10 and also includes complementary spaced male and female connector elements 42, 44 of the "tongue-and-groove" fastener type adapted to respectively engage with end connector elements 18, 20 of the cable protector, and which resultingly forms a raised curb. The lower surface of the curb may have a cutout portion 46 forming channels 48 to enable the passage therebeneath of the cables or hoses which extend through the cable protector 10 within the spaces intermediate the longitudinal rib members 28 formed therein.

The cable protector 10, which has the male and female connector elements 18, 20 formed in the side walls thereof, in addition to those at the ends for mounting the curbs 40, is adapted to be connected to a ramp element 50 which, in essence is a rectangular plate-like member of tapered or sloping cross-section, whereby the higher end edge 52 which is coextensive in height with that of the cable protector 10, and is adapted to be fastened thereto by means of suitable complementary spaced male and female connector elements 54, 56, and whereby the thinner distant edge 58 thereof is spaced in parallel with the sidewall of the cable protector so as to form essentially a stepless ramp structure when attached thereto.

Curbs 60 and 61, which are mirror-images, and which are similar to those curbs 40 utilized for the cable protector 10, but which are tapered to some extent so as to be lower towards the thinner end 58 of the ramp 50, are also equipped with male and female connector elements 62, 64 so as to latch to connectors 66, 68 at the opposite ends 70 of the ramp member 50 when the latter is latched to the cable protector 10, and thereby forms at each end a continuous curb structure in conjunction with the curb 40 of the cable protector 10.

As shown in FIG. 2 of the drawings, the cable protector 10 has the cover 24 pivoted upwardly about hinge structure 26 to enable positioning therein between the rib members 28 of electrical cables, fluid conduits and/or data cables, as required, so as to extend outwardly from the open end channels 16 of the base 12, as described hereinbefore with regard to FIG. 1 of the drawings. Thereafter, as illustrated, the cover 24 may be closed, and suitably fastened to the base 12 by means of screw fasteners or the like (not shown), for the purpose of which there may be suitable bosses with threaded apertures molded into the base structure.

The entire cable protective arrangement, and all of the elements, such as the cable protector 10, the ramp 50 and the curb elements 40, 60 may each be molded of a rigid, high-strength plastic material able to withstand repeated loadings and stresses. Moreover the plastic material lends itself to have ANSI safety symbols molded therein and to be of a highly visible contrasting color, so as to cause pedestrians and others using the ramp to be aware of the presence of the structure, while also, although temporary in nature, imparting a decorative appearance to the various assembled components.

Figure 3:
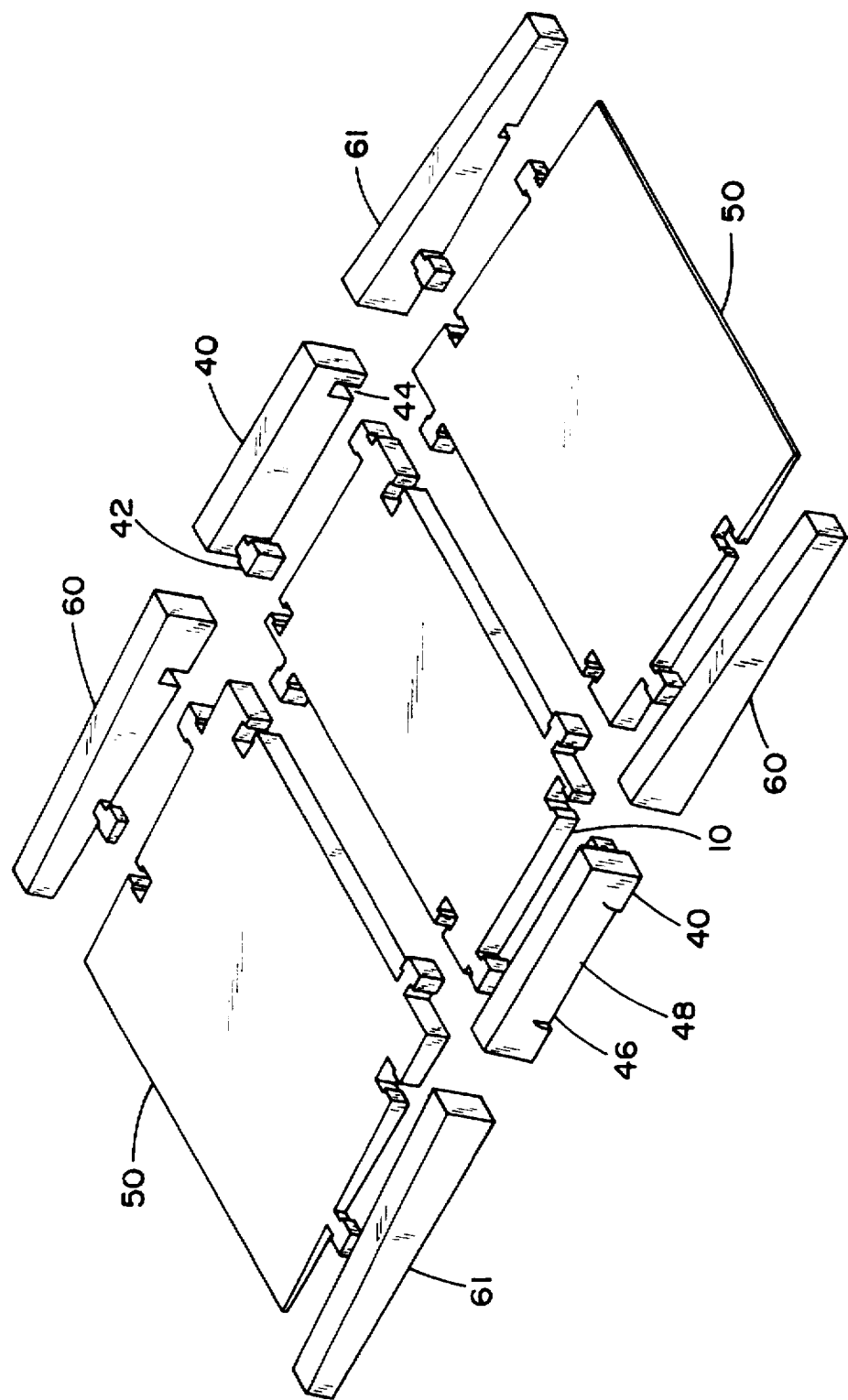
FIG. 3 illustrates a complete crossover cable protection system including a single cable protector having crossover ramps and curbs attached on opposite sides thereof.

Referring to FIG. 3 of the drawings, which is basically similar to FIG. 1, in that instance, elements which are similar or identical to those described in connection with FIG. 1 of the drawings are identified by the same reference numerals. In this instance, a ramp member 50 and its respective curb portion 60, 61 are attached to the respective opposite sides of the cable protector component 10, so as to form a complete crossover arrangement, in effect, a downward and upward sloping ramp on opposite sides of the cable protector extending over a walkway or the like.

Pursuant to the present invention, it is possible to attach a plurality of cable protectors 10 in various arrays so as to be able to protect any number of cables, conduits or the like as desired, over different widths of roadways and walkways.

Figure 4:
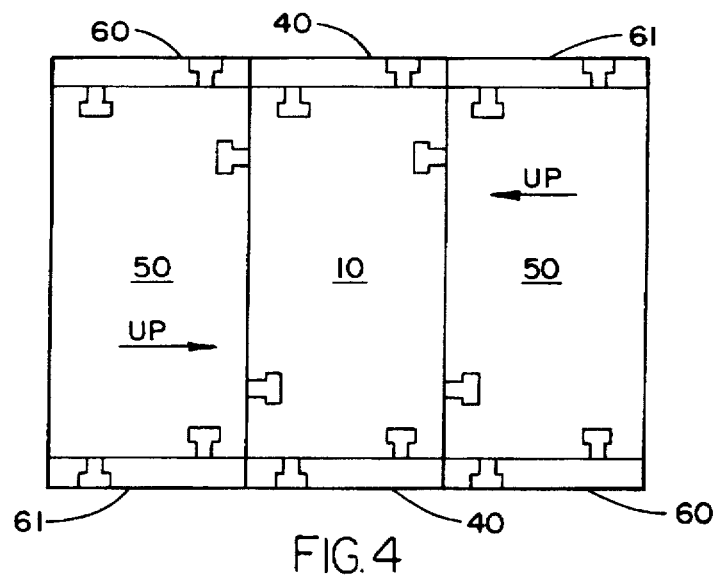
FIGS. 4 through 6 illustrate, respectively, different arrangements of cable protectors and ramps to form complete crossover cable protection systems of various sizes and dimensions.

Thus, for example, referring to FIG. 4 of the drawings, this is primarily a plan view of the arrangement of FIG. 3, shown in its assembled condition for installation over a walkway or the like, and in which a single cable protector 10 is attached to an upward and downward sloping ramp 50 on respectively both sides thereof, with curbs 40, 60, 61 bordering the assembly.

Furthermore, this assembly is compliant with 28C.F.R. Part 36, Appendix A—Standards for Accessible Design.

Figure 5:
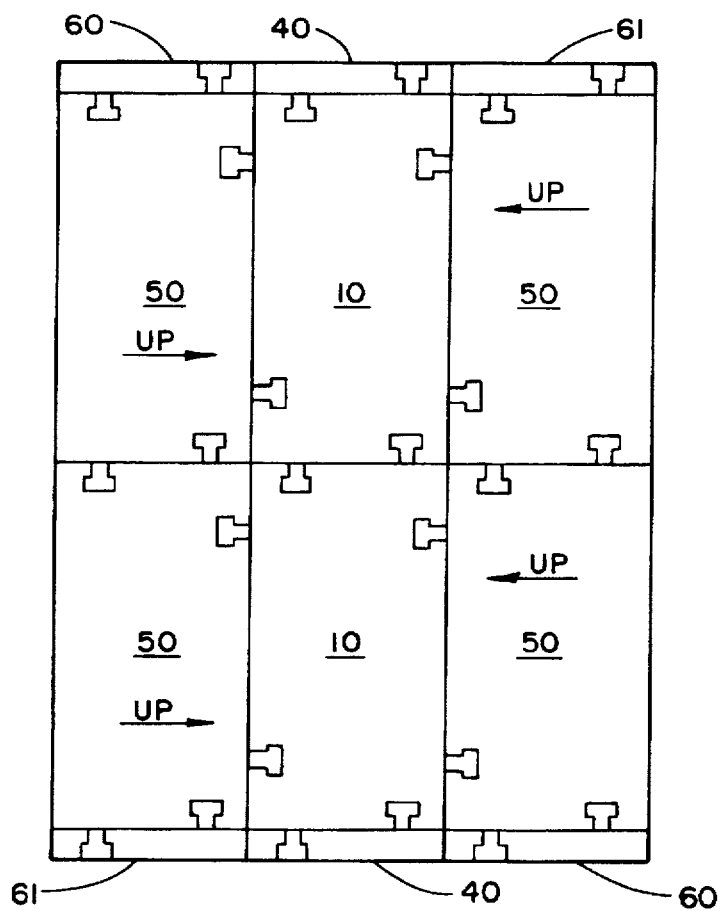

As illustrated in FIG. 5 of the drawings, when it is adapted to protect a wider walkway or site road or roadway, it is merely necessary to attach, for example, two modular cable protectors 10 end to end, and to enable the cables to extend continuously therethrough intermediate the rib member 28, and attach an up ramp and a down ramp 50 to, respectively, opposite sides of each of the modular cable protectors and the side edges of the ramps to each other, with the curbs being attached as heretofore. In this instance, the arrangement is adapted to protect cables extending beneath a walkway or roadway which is twice the width of that shown in FIGS. 3 and 4 of the drawings.

Figure 6:
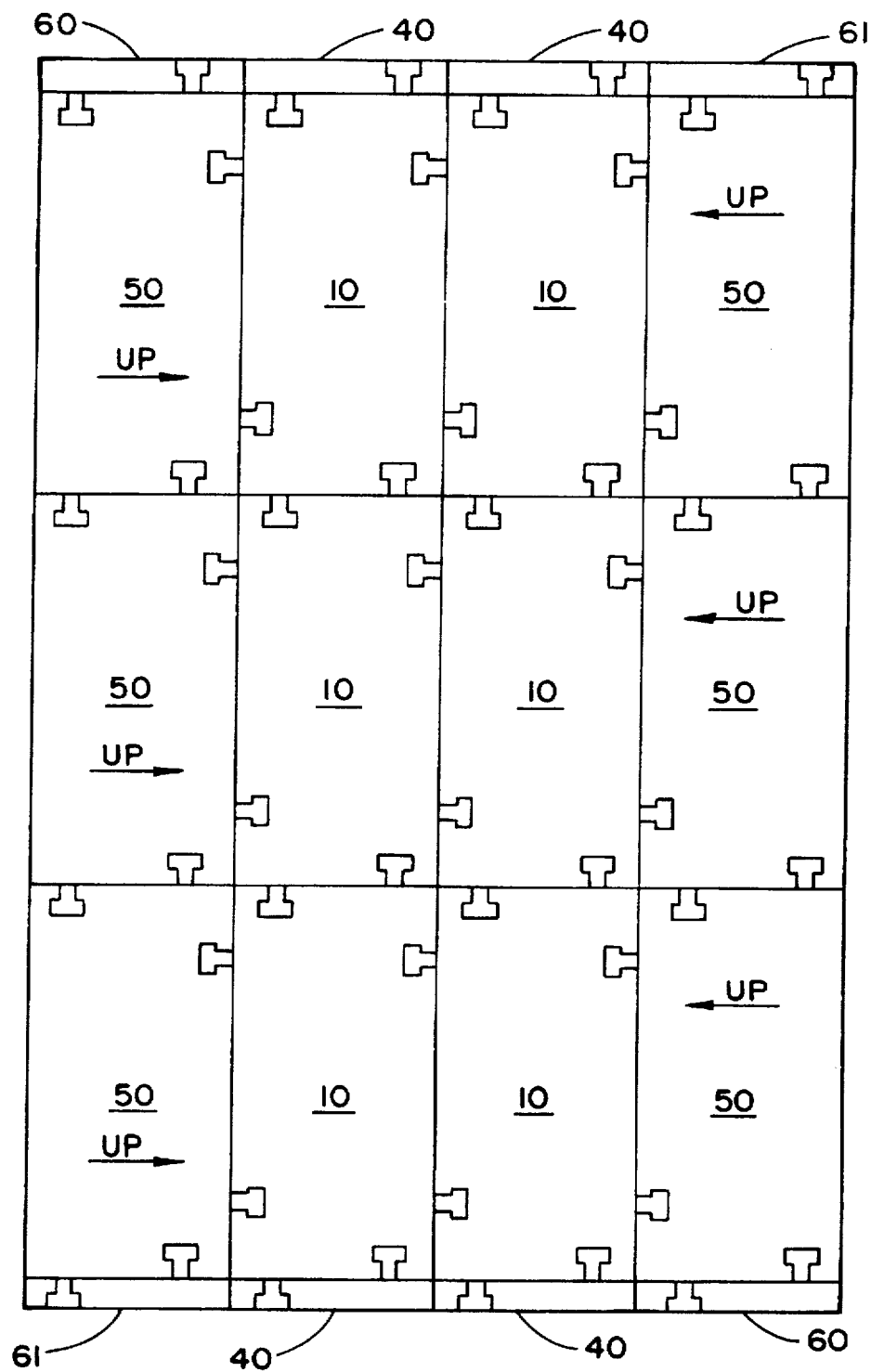

As illustrated in FIG. 6 of the drawings, in that case it may be desired to cover a much wider and deeper walkway or roadway. Consequently, six cable protectors 10 are shown interconnected with each other, whereby three protectors are each connected end to end, and in a width of two side-by-side protectors 10 for a total of six cable protectors, although other numbers may be readily utilized as required.

The outer sides of the respective interconnected cable protectors 10 may have the up and down ramps 50 attached thereto on opposite sides, with the ramps also being interconnected with each other through intermediary of the interengaged complementary male and female connector elements or so called tongue-and-groove fasteners, and with suitable curbs 40 being fastened to the cable protectors 10 and curbs 60, 61 to the ramps 50 so as to form an overall modular cable protection system of suitable larger width and length dimensions.

If necessary, further cable protectors and/or ramps may be attached as desired in various arrays to provide any suitable configuration in a simple and rapid manner.

The foregoing structures which are adapted to protectively house electrical cables, conduits and hoses running on the ground so as to be protected from the public and to eliminate tripping hazards, are adapted to provide decorative temporary installations which may be easily and inexpensively assembled and disassembled without the need for any special tools or skilled labor.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A modular cable protection system which is expandable in both crossover length and cable capacity; comprising:

(a) at least one cable protector including a generally planar base member resting on the terrain; and a cover structure covering said base member so as to form an interspace therewith adapted to enable electrical cables, data cables and fluid hoses to extend through said interspace; and male and female connector means spaced about the periphery of said base member so as to enable both parallel or series assembling;

(b) and ramp structure arranged at least at one side of said base member, said ramp structure including female and male connector means connectable to complementary said male and female connector means at said at least one side of said base member so as to form said modular cable protection system.

2. A modular cable protection system as claimed in claim 1, wherein said base member has a generally rectangular configuration and includes upstanding walls extending about the perimeter of said base member, said cover structure being supported on said walls.

3. A modular cable protection system as claimed in claim 2, wherein means hingedly connect said cover structure to said upstanding walls of said base member.

4. A modular cable protection system as claimed in claim 2, wherein elongate bar-shaped members are connectable to opposite end sides of said base member and ramp structure so as to form a curb arrangement defining a width of said system.

5. A modular cable protection system as claimed in claim 4, wherein each said bar-shaped member is rectangular in cross-section and has a height greater than the height of said base member and said ramp structure.

6. A modular cable protection system as claimed in claim 5, wherein each said bar-shaped member includes spaced male and female connector means which are interengageable with complementary said female and male connector means on said base member and said ramp structure.

7. A modular cable protection system as claimed in claim 4, wherein opposite sides of said base member have openings formed in upstanding walls thereof, said bar-shaped members which are attached to sides of said base member have raised lower surfaces forming recesses enabling passing therethrough of electrical cables, data cables and fluid hoses extending from said interspace between said base member and said cover structure.

8. A modular cable protection system as claimed in claim 7, wherein a plurality of elongate spaced upstanding ribs are provided in said base member extending between end sides of said base member so as to form separate passageways for electrical cables, data cables and fluid hoses.

9. A modular cable protection system as claimed in claim 8, wherein said elongate upstanding ribs are integrally formed with said base member.

10. A modular cable protection system as claimed in claim 8, wherein said cover structure is supported on said ribs in a closed position of the cover structure on said base member.

11. A modular cable protection system as claimed in claim 4, wherein said ramp structure comprises a rectangular plate member, said plate member having one side which is connected to said base member being of a height substantially equal to a height of an upstanding wall thereof, and said plate member sloping downwardly to a lower height at an opposite side thereto.

12. A modular cable protection system as claimed in claim 11, wherein said bar-shaped members which are connectable to said ramp structure are downwardly tapering toward said opposite side having the lower height.

13. A modular cable protection system as claimed in claim 2, wherein ramp structures are connectable to opposite sides of said base member so as to form an up-and-down crossover arrangement for pedestrian and vehicular traffic.

14. A modular cable protection system as claimed in claim 2, wherein a plurality of said base members are interconnected in an end-to-end array.

15. A modular cable protection system as claimed in claim 2, wherein a plurality of said base members are interconnected in a side-by-side array.

16. A modular cable protection system as claimed in claim 2, wherein a plurality of said base members are interconnected in an end-to-end and side-by-side array.

17. A modular cable protection system as claimed in claim 14 or 15 or 16, wherein ramp structures are connected to respectively opposite sides of said array.

18. A modular cable protection system as claimed in claim 1, wherein said base member, said cover structure and said ramp structure are components which are color-coded relative to each other.

19. A modular cable protection system as claimed in claim 18, wherein said components are constituted of a high-strength rigid molded plastic material.

20. A modular cable protection system as claimed in claim 1, wherein said male and female connector means are interlockable tongue-and-groove type connectors.

* * * * *